United States Patent
Heber et al.

(10) Patent No.: US 10,712,488 B2
(45) Date of Patent: Jul. 14, 2020

(54) SCREEN FOR A FREE AND A RESTRICTED VIEWING MODE

(71) Applicant: siOPTICA GmbH, Jena (DE)

(72) Inventors: André Heber, Weimar (DE); Uwe Schroeter, Dornburg-Camburg (DE); Juergen Schwarz, Apolda (DE); Ambrose Peter Nari, Jena (DE); Markus Klippstein, Jena (DE); Stepan Alkhimenko, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 16/476,846

(22) PCT Filed: Jun. 28, 2018

(86) PCT No.: PCT/EP2018/067473
§ 371 (c)(1),
(2) Date: Jul. 9, 2019

(87) PCT Pub. No.: WO2019/002496
PCT Pub. Date: Jan. 3, 2019

(65) Prior Publication Data
US 2019/0353838 A1    Nov. 21, 2019

(30) Foreign Application Priority Data

Jun. 30, 2017   (DE) ........................ 10 2017 006 285

(51) Int. Cl.
*F21V 8/00*   (2006.01)
*B60K 35/00*  (2006.01)

(52) U.S. Cl.
CPC ............ *G02B 6/0036* (2013.01); *B60K 35/00* (2013.01); *G02B 6/0065* (2013.01);
(Continued)

(58) Field of Classification Search
CPC .. G02B 6/0035; G02B 6/0036; G02B 6/0038; G02B 6/004; G02B 6/0041;
(Continued)

(56) References Cited

U.S. PATENT DOCUMENTS

| 5,956,107 A | 9/1999 | Hashimoto et al. |
| 5,993,940 A | 11/1999 | Ouderkirk et al. |

(Continued)

FOREIGN PATENT DOCUMENTS

| CN | 105487292 A | 4/2016 |
| CN | 206057756 U | 3/2017 |

(Continued)

*Primary Examiner* — Alan B Cariaso
(74) *Attorney, Agent, or Firm* — Christensen, Fonder, Dardi & Herbert PLLC (57) ABSTRACT

An illuminating apparatus for a screen operable in at least two operating modes, viz B1 for a free viewing mode and B2 for a restricted viewing mode. The illuminating apparatus comprising: a backlight with a planar extension radiating light in a restricted angular range; a plate-shaped light guide that is, in a viewing direction, arranged in front of the backlight and with outcoupling elements one of the large surfaces and/or within its volume. The light guide is transparent to at least 70% of the light emitted by the backlight and light sources are arranged laterally at the edges of the light guide. Various parameters are specified for the number of outcoupling elements per unit area and for their extension, and in operating mode B2, the backlight is switched on and the light sources are switched off. In operating mode B1 at least the light sources are switched on.

20 Claims, 4 Drawing Sheets

(52) U.S. Cl.
CPC .............. *B60K 2370/1526* (2019.05); *B60K 2370/164* (2019.05); *B60K 2370/195* (2019.05); *B60K 2370/33* (2019.05); *G02B 6/0076* (2013.01)

(58) Field of Classification Search
CPC .. G02B 6/0043; G02B 6/0076; G02B 6/0065; B60K 2370/164; B60K 35/00; B60K 2370/1526; B60K 2370/195; B60K 2370/33

See application file for complete search history.

(56) References Cited

U.S. PATENT DOCUMENTS

| | | | |
|---|---|---|---|
| 6,765,550 B2 | 7/2004 | Janick et al. | |
| 7,303,322 B2 | 12/2007 | Lamb et al. | |
| 7,430,028 B2 | 9/2008 | Tsai et al. | |
| 7,534,026 B2 | 5/2009 | Uehara et al. | |
| 7,683,867 B2 | 3/2010 | Inoue et al. | |
| 7,974,506 B2 | 7/2011 | Wittenberg et al. | |
| 8,928,555 B2 | 1/2015 | Want et al. | |
| 9,881,531 B2 | 1/2018 | Klippstein et al. | |
| 10,036,846 B2 | 7/2018 | Lee et al. | |
| 10,181,306 B2 | 1/2019 | Chang et al. | |
| 10,241,355 B2 | 3/2019 | Alkhimenko et al. | |
| 2007/0030240 A1 | 2/2007 | Sumiyoshi et al. | |
| 2007/0285775 A1 | 12/2007 | Lesage et al. | |
| 2008/0043490 A1* | 2/2008 | Coleman ............... | G02B 6/0036 362/623 |
| 2008/0112187 A1 | 5/2008 | Katsumata et al. | |
| 2009/0067156 A1 | 3/2009 | Bonnett et al. | |
| 2011/0128470 A1 | 6/2011 | Yorita et al. | |
| 2012/0235891 A1 | 9/2012 | Nishitani et al. | |
| 2013/0162924 A1 | 6/2013 | Sahouani et al. | |
| 2013/0308185 A1 | 11/2013 | Robinson et al. | |
| 2014/0286044 A1* | 9/2014 | Johnson ............... | G02B 6/0053 362/607 |
| 2016/0313494 A1* | 10/2016 | Hamilton ............... | G02B 5/0221 |
| 2017/0010407 A1* | 1/2017 | Huang ............... | G02B 6/0068 |
| 2017/0176652 A1* | 6/2017 | Wheatley ............ | G02F 1/13476 |
| 2017/0261672 A1 | 9/2017 | Liu et al. | |
| 2018/0003364 A1 | 1/2018 | Wheatley et al. | |
| 2018/0059308 A1 | 3/2018 | Li | |
| 2018/0267344 A1 | 9/2018 | Wu | |

FOREIGN PATENT DOCUMENTS

| | | |
|---|---|---|
| CN | 206163104 U | 5/2017 |
| CN | 107734118 A | 2/2018 |
| DE | 10 2014 018 227 A1 | 6/2016 |
| EP | 2 270 556 A1 | 1/2011 |
| EP | 2 662 713 A1 | 11/2013 |
| EP | 3 115 839 B1 | 3/2019 |
| EP | 3 244 256 B9 | 7/2019 |
| EP | 3 511 616 A1 | 7/2019 |
| GB | 2 428 128 A | 1/2007 |
| JP | 2007-155783 A | 6/2007 |
| TW | 201643473 A | 12/2016 |
| WO | WO 2005/071449 A2 | 8/2005 |
| WO | WO 2007/100458 A1 | 9/2007 |
| WO | WO 2007/140345 A2 | 12/2007 |
| WO | WO 2012/033583 A1 | 3/2012 |
| WO | WO 2013/173483 A1 | 11/2013 |
| WO | WO 2015/121398 A1 | 8/2015 |
| WO | WO 2016/160048 A1 | 10/2016 |
| WO | WO 2017/027618 A1 | 2/2017 |
| WO | WO 2017/065745 A1 | 4/2017 |
| WO | WO 2017/089482 A1 | 6/2017 |
| WO | WO 2018/141823 A1 | 8/2018 |
| WO | WO 2018/182991 A1 | 10/2018 |

* cited by examiner

SCREEN FOR A FREE AND A RESTRICTED VIEWING MODE

PRIORITY CLAIM

The present application is a National Phase entry of PCT Application No. PCT/EP2018/067473, filed Jun. 28, 2018, which claims priority from German Patent Application 10 2017 006 285.4, filed Jun. 30, 2017, the disclosures of which are hereby incorporated by reference herein in their entirety.

FIELD OF THE INVENTION

In recent years, great strides have been made in enlarging the visual angle of LCDs. Frequently, however, there are situations in which such a very large angular viewing range of a screen can be a disadvantage. Increasingly, information such as banking data or other private particulars and sensitive data is becoming available on mobile devices such as notebooks and tablet PCs. Accordingly, users require some control of who is allowed to see such sensitive data; they must be able to choose between a wide viewing angle in order to share displayed information with others, e.g., when looking at vacation snaps or reading advertisements, and, on the other hand, a narrow viewing angle needed to keep displayed information private.

A similar problem is encountered in vehicle manufacturing: Here, when the motor is running, the driver must not be distracted by image contents such as digital entertainment shows, whereas a front-seat passenger would like to watch them during the ride. This requires a screen that can be switched between corresponding display modes.

DESCRIPTION OF PRIOR ART

Accessory films based on micro-louvers have already been used on mobile display screens to provide optical data protection in what is known as a privacy mode. However, such films are not capable of being switched between modes but have to be applied and removed manually. Also, they have to be carried separately from the display screen when not in use. Another substantial disadvantage is the light loss accompanying the use of such louver films U.S. Pat. No. 6,765,550 describes such privacy protection provided by micro-louvers. Here, the biggest disadvantages are the need to mechanically attach or remove the filter, and the light loss in the protected mode.

U.S. Pat. No. 5,993,940 describes the use of a film the surface of which is provided with small, regularly arranged prismatic strips to create a privacy mode. The development and fabrication of this film are quite complicated.

In WO 2012/033583, switching between free and restricted viewing is effected by the triggering of liquid crystals arranged between so-called "chromonic" layers. This involves a light loss, and implementation is rather complicated, too.

US 2009/0067156 discloses a great number of ideas to configure an illuminating system and a display device. In particular, the version illustrated there in FIGS. 3A and 3B uses two backlights consisting of wedge-shaped light guides, and an LCD panel, where the posterior backlight 40 is intended to positively create a wide illuminating angle, and the anterior backlight 38 is intended to positively create a narrow illuminating angle. It remains unclear, however, in what manner the backlight 38 is meant to create a narrow illuminating angle without converting the light having a wide illuminating angle, originating from backlight 40, essentially into light having a narrow illuminating angle when it passes backlight 38.

Figure 5:
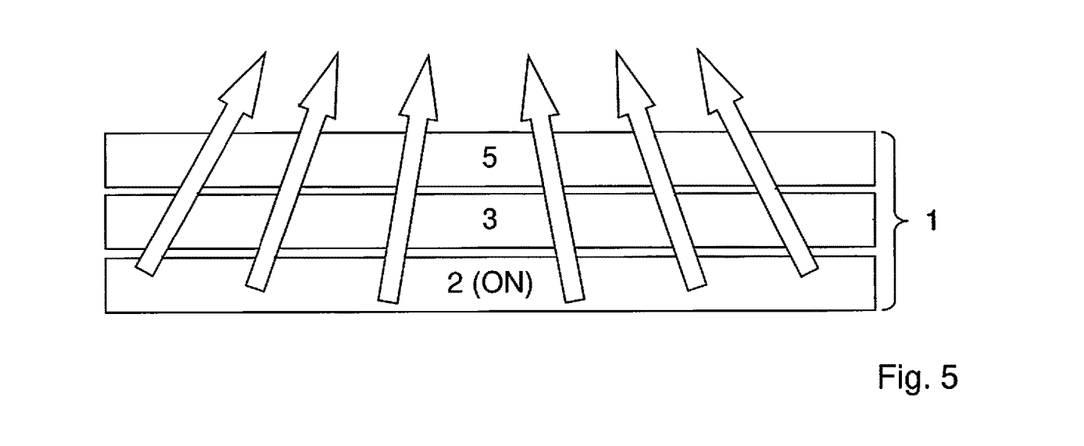
FIG. 5 is a sketch illustrating the principle of the invented illuminating apparatus in interaction with an image generator in mode B2 for a restricted viewing mode.

Regarding the configuration shown in FIG. 5 of US 2009/0067156, it should be noted that the two light guides 46 and 48 each produce "narrow light", i.e. light with a narrow illuminating angle. Conversion of the light in light guide 48 into "wide light", i.e. light with a wide illuminating angle, is only achieved by means of a partial mirror 50, which has to be provided with prism structures in a complex process. This conversion extremely diminishes the light intensity, because the light that at first exits in a narrow illuminating angle (the only light available) is then spread out into a wide illuminating angle, as a rule into the semispace. As a result, the brightness will be reduced by a factor of 5 or higher (as regards luminance), depending on the parameters. Thus, this configuration is of little practical relevance.

Figure 7:
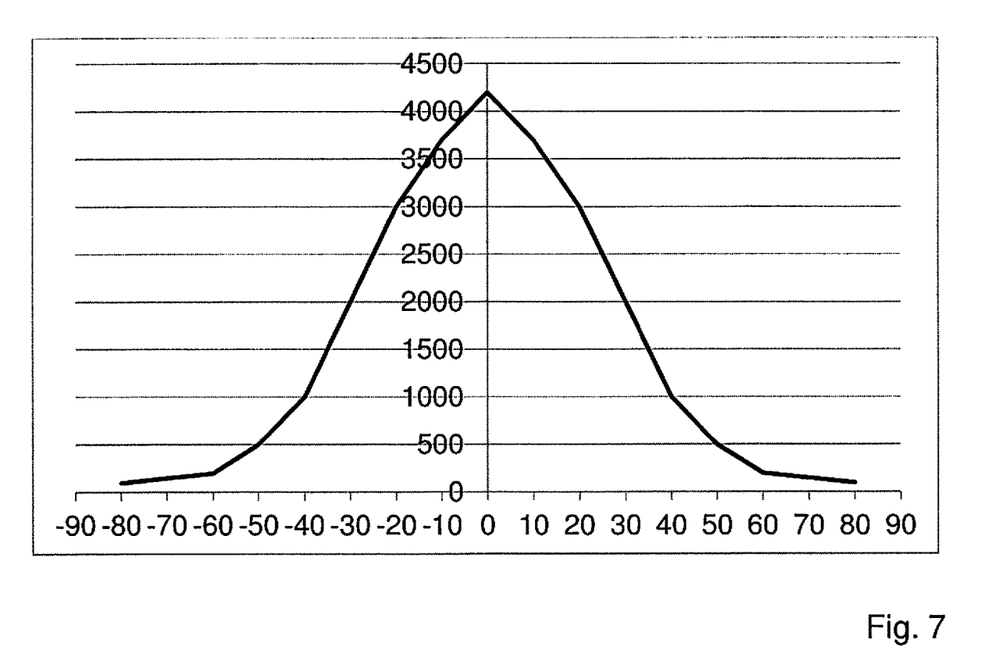
FIG. 7 is a graph of the relative brightness of the light outcoupled from the light guide, measured in the vertical direction.

In the embodiment according to FIG. 7 of US 2009/0067156, a phosphorus layer that converts UV light into visible light is an absolute must. This is rather laborious to do; and given the aim to get sufficient light from the backlight to illuminate an LCD so that it can be read, one needs very high UV intensities. Therefore, this configuration is expensive and complicated; shielding off the UV radiation alone makes it impracticable.

US 2012/0235891 describes a highly complex backlight in a screen. According to FIGS. 1 and 15, this design employs not only several light guides but also other complex optical elements such as microlens elements 40 and prism structures 50, which convert the light coming from the posterior illumination on the way to the anterior illumination. This is expensive and complicated to implement, and it involves a light loss. According to the version shown in FIG. 17 in US 2012/0235891, both light sources 4R and 18 produce light having a narrow illuminating angle, with the light radiated by the posterior light source 18 first being laboriously converted into light with a large illuminating angle. This complex conversion greatly diminishes brightness, as noted already above.

According to JP 2007-155783, special optical surfaces 19 that are difficult to compute and to manufacture are used to deflect light into varied narrow or broad regions depending on the light incidence angle. These structures are similar to Fresnel lenses. Furthermore, there exist inactive edges, which deflect light into unwanted directions. Thus, it remains uncertain whether really useful light distributions can be achieved.

For achieving restricted vision as taught by GB 2428128 A, additional light sources, which are arranged at a conspicuous distance from the screen and illuminate a hologram attached to the screen, are used to overlay the lateral view with special wavelengths. The disadvantages here are the necessary spacing of the light sources from the screen, and the complexity of making suitable holograms.

US 2013/0308185 describes a special light guide provided with steps, which radiates light on a large area into various directions, depending on the direction in which it is illuminated from an edge. In interaction with a transmissive imager, e.g., an LC display, a screen that is switchable between a free and a restricted viewing mode can be produced. Here, a disadvantage, among others, is that the restricted view effect can only be created either for a left/right or a top/bottom direction, but not for left/right and top/bottom directions simultaneously as needed for certain payment actions. In addition, some residual light is still visible from blocked viewing angles even in the restricted viewing mode.

In WO 2015/121398, the applicant discloses a screen of the kind described at the start that, for switching between modes, essentially has scattering particles provided in the volume of the respective light guide. The scattering particles chosen there, consisting of some polymerizate, as a rule suffer the disadvantage, however, that light is coupled out from both of the large surfaces, whereby about half of the useful light is radiated in the wrong direction, i.e. toward the backlight, from where, due to the design, it cannot be recycled to a sufficient degree. Moreover, the scattering polymerizate particles distributed in the volume of the light guide may possibly, especially at higher concentrations, lead to scattering effects that diminish the privacy protection effect in the protected mode.

The methods and arrangements mentioned above have, as a rule, the common disadvantages that they distinctly reduce the brightness of the basic screen, and/or require an active, but at least a special, optical element for switching between the modes, and/or are complicated and expensive to fabricate, and/or degrade resolution in the free viewing mode.

Light guides in backlight designs for LCD screens are typically made from plastic materials (e.g., PMMA or polycarbonate) by methods suitable for cost-effective mass production such as injection molding. The light guides made in this way have, as a rule, coarse macroscopic surface blemishes well discernible with the naked eye, which couple out the light. Due to such coarse textures, the haze levels of such light guides are rather high, as a rule, possibly adopting values of 15% or even markedly higher. Scattering properties of that kind make it impossible for light already focused on the large surfaces to penetrate such a light guide without being appreciably influenced. In addition, state-of-the-art light guides invariably require additional optical layers to radiate evenly distributed light of adequate usefulness for LCD panels. Means used for this purpose, are, e.g., diffuser films, brightness enhancement films (BEF, DBEF), or reflectors that return the light coupled out of the back surface. Especially due to the coarse outcoupling structures, often designed as scattering elements, the use of such light guides without a diffuser is not possible without a marked loss in light homogeneity.

SUMMARY OF THE INVENTION

Departing therefrom, the problem of the invention is to describe an illuminating apparatus by which, in interaction with a screen, secure presentation of information can be implemented by way of an optionally restricted viewing angle, with a second operating mode enabling free vision with a viewing angle that is as unrestricted as possible. The invention is intended to be implementable by simple means and as low-prized as possible. In both operating modes, the highest possible resolution is to be visible, with particular preference of the native resolution of the screen used. Further, the invented solution is to cause the least possible light loss. This task is solved by means of an illuminating apparatus for a screen, the said illuminating apparatus being operable in at least two operating modes, viz B1 for a free viewing mode and B2 for a restricted viewing mode, and comprising a backlight of planar extension that radiates light in a restricted angular range. An eligible restricted angular range may generally be any range that is smaller than the semispace in front of the backlight; preferably intended here, however, is an angular range e.g., of +/−20 or 30 degrees horizontally and/or vertically or as a cone about the normal to the surface or a selectable direction vector on the backlight, with small light levels of less than 1% to 5% maximum brightness being negligible. Initially, the terms "vertically" and "horizontally" generally relate to two mutually perpendicular preferred directions on the surface of the backlight or on a large surface of a light guide which, in operation, correspond to a direction that is actually horizontal or vertical relative to the position of a viewer and, thus, of the earth's surface, depending on the orientation of the screen used with the illuminating apparatus, the said screen being fixed, as a rule.

The illuminating apparatus further comprises a plate-shaped light guide that is located in front of the backlight as seen in the viewing direction, has at least four narrow sides (edges) and two large surfaces, and is provided with outcoupling elements on at least one of the large surfaces and/or within its volume, the said light guide being transparent to at least 70% of the light emitted by the backlight, and with light sources arranged laterally at the edges of the light guide, preferably at one or both of the long edges of the light guide.

The number of outcoupling elements per surface area and their extension are selected such that the light guide, on at least 50% but preferably 80% of its surface, has an average haze value of less than 7%, but preferably less that 2% or, with special preference, less than 1%, measured according to ASTM D1003 (the measurement here being based on the more common procedure A with a haze meter as reference), whereby the light radiated by the backlight at least in B2 mode in a restricted angular range is only negligibly, if at all, scattered at angles outside the said angular range when it passes the light guide. "Negligibly" means, e.g., that, due to the low haze, within a horizontal angle of, say, 40° from the surface normal, the light density includes a share of maximally 1% contributed by scattering, which is radiated by the illuminating apparatus at an angle of 0°.

In the fabrication of the light guide, the outcoupling elements can, in principle, be distributed in or on the light guide in various ways to meet adaptable and pre-set conditions. The outcoupling elements are locally limited structural changes in the volume and/or on the surfaces of the light guide. Therefore, the term "outcoupling element" expressly excludes any additional optical layers applied on the surfaces of the light guide, such as diffusion, reflection, polarization recycling or (dual) brightness enhancement layers ((D)BEF). These additional layers not considered as outcoupling elements are joined to the light guide at the edges only, whereas they merely loosely rest on the large surfaces without forming a solid physical whole with the light guide. By contrast, any lacquers or varnishes applied on the large surfaces and joining to them by chemical reactions form an inseparable, solid physical whole with the light guide; therefore, such lacquers or varnishes are not additional layers within the sense described above.

The structure of the outcoupling elements can be given so that the effect of each outcoupling element is at least approximately known, and properties of the light guide or of the light exiting it can be specified in a targeted manner by a predetermined distribution of the outcoupling elements.

According to the invention, a distribution of the outcoupling elements on at least one of the large surfaces and/or within the volume of the light guide is specified in such a way that light irradiated by the light sources into the light guide and coupled out of the light guide by the outcoupling elements satisfies the following conditions:

At least 30% of the quantity of light outcoupled at one of the large surfaces in an angular range between −50° and +50° is radiated in an angular range between −20° and +20° relative to one or two specified preferred directions that are perpendicular to each other and to the surface normal, and/or at least 40% of the quantity of light outcoupled at one of the large surfaces in an angular range between −50° and +50° relative to the normal to the large surface is radiated in an angular range between −30° and +30° relative to the one or two preferred directions, and at least 50%, preferably at least 60% or, with particular preference, at least 80% of the quantity of light coupled out of the light guide (3) is coupled out in the direction leading away from the backlight (2).

The two operating modes B1 and B2 further differ in that, in mode B1, the backlight is switched on and the light sources (on the edges of the light guide) are switched off, whereas in mode B1 at least the light sources (on the edges of the light guide) are switched on. Taken into account here is only the light originally radiated by the light sources into the light guide and subsequently radiated by the light guide via the outcoupling elements, with radiation taking place almost exclusively via the outcoupling elements.

The preferred directions may correspond to the above-mentioned vertical or horizontal directions in an external reference frame.

In mode B1, as described above, at least the light sources on the edges of the light guide are switched on, whereas the backlight may be switched on or off. The desired properties of the outcoupling elements essential for the invention with regard to their number per unit area, their shape and extension in three dimensions, and their distribution over at least one of the large surfaces and/or the volume of the light guide can be determined, e.g., by means of an optics simulation software such as "VirtualLab" available from LightTrans or other suppliers, and then be physically implemented accordingly.

In prior art, the radiation characteristics described above are not achieved without the use of additional layers such as reflectors, BEF, DBEF, prism films or diffusers. Here, the special radiation characteristics serve, in particular, to achieve a sufficiently efficient light gain, because a screen equipped with the invented illuminating apparatus is typically looked at within a narrow vertical angular range of −20° to +20° or −30° to *30° only. At the same time, one must take care to achieve the low haze levels essential for the invention, so as not to impair the privacy protection effect in mode B2.

Outcoupling elements may be provided on both the large surfaces and, as an option, additionally in the volume.

The light guide preferably consists of some transparent thermoplastic or thermoelastic material or of glass.

Preferably, the distribution of the outcoupling elements on at least one of the large surfaces and/or within the volume of the light guide is specified in such a way that the light coupled out reaches a luminance homogeneity of 70% on at least 70% of the light guide surface. For this purpose, the luminance homogeneity can be defined as $Lv^{min}/Lv^{max}$, i.e. the ratio of the lowest to the highest luminance value per unit area. Another rule for defining luminance homogeneity is given in "Uniformity Measuring Standard for Displays V1.2" by the Deutsches Flachdisplay-Forum.

Furthermore, it is of advantage for some applications if the said restricted angular range is configured asymmetrically relative to the surface normal of the backlight. The asymmetric configuration is preferably implemented in one of the preferred directions. This is helpful, in particular, in motor vehicle applications, e.g., if a screen to be combined with the invented illumination apparatus to form a so-called center information display is arranged on the dashboard about halfway between the driver and the front-seat passenger. In this case, the restricted angular viewing range that is exclusively free for the passenger must be configured asymmetrically, i.e. directed towards the passenger. Here, the preferred direction in which the asymmetry is provided corresponds to the horizontal.

The outcoupling elements have maximum dimensions of 100 μm, preferably between 1 μm and 30 μm.

The outcoupling elements for light outcoupling from at least one of the large surfaces of the light guide preferably consist of microlenses and/or microprisms and/or diffractive structures and/or three-dimensional structural elements and/or scattering elements with their largest dimension having a maximum extension smaller than 35 micrometers, but preferably smaller than 15 micrometers. In case of diffractive structures, these may be a hologram or a grating/diffraction grating.

Alternatively, the outcoupling elements themselves may merely have the outer shape of microlenses, microprisms, scattering elements and/or diffractive structures. In this case, they may be configured especially as cavities formed in the volume of the light guide. The cavities may be evacuated, but preferably are filled with some gaseous, liquid or solid material, the material having a refractive index that differs from, and preferably is lower than, that of the material of the light guide. By filling the cavities with material and selecting the material one can influence the light conduction and outcoupling. Alternatively or additionally, also the haze value of the material preferably differs from, and preferably is higher than, that of the light guide. This configuration has the advantage of higher efficiency in light outcoupling.

Alternatively, and in a technically easier way, the cavities can be formed if the light guide is made by joining two substrate layers that are preferably similar. They can be joined chemically, e.g. by adhesive bonding. The cavities, then, are formed as recesses on at least one of the boundary surfaces of the substrate layers.

If the outcoupling elements are provided on at least one of the large surfaces of the light guide, they are favorably fashioned from some plastic or glass, with the structure having been embossed thereon by means of a tool. This is possible, e.g., in mass production by applying a UV-hardening material—e.g., a varnish, a monomer etc.—onto a light guide substrate, the said material being structured by means of a tool and hardened, e.g., polymerized, under UV irradiation. Other radiation-hardening materials may be used as well. Forming the recesses to implement the outcoupling elements is possible, e.g., by mechanical, lithographic or printing processes, but also by material deposition, material conversion, material abrasion or material dissolution.

In that way, e.g., grating structures, microprisms—convex (with the plastic parts protruding from the surface) and/or concave (embossed or recessed within the surface layer of the structured plastic)—, other three-dimensional structural elements of other shapes, or even microlenses can be mass-produced at low cost. Both concave and convex structures can be employed equally.

The light guide or its substrate finally may contain at least 40 wt.-%, or preferably 60 wt.-%, polymethylmethacrylate, related to its weight. Alternatively, the material contained may be polycarbonate, e.g.

The backlight consists, e.g., of a planar emitter, preferably another light guide with further light sources arranged laterally or on the rear surface, plus at least one light collimator integrated in, and/or arranged in front of the planar emitter, such as at least one prism film and/or at least one privacy filter (micro-louver filter).

Accordingly, the backlight may, in principle, be designed similar to an LED backlight, e.g., as a sidelight, edge light, direct LED backlight, edge LED backlight, OLED or some other planar emitter on which, e.g., at least one permanent privacy filter (with micro-louvers) is applied. Other versions use devices known as directed backlights.

In another favorable embodiment of the invention, in mode B1, as a function of specified limiting angles σ, γ, the outcoupled light exiting from the light guide at an angle β will, at every point of the light guide surface in angular ranges satisfying the conditions of 80°>β>γ and/or −80°<β<−σ, with 10°<γ<80° and 10°<σ<80° and preferably with γ=σ=40°, measured normal to the light guide surface and in at least one of the two preferred directions, have maximally 80%, preferably 60% or, with particular preference, maximally 50% of the light intensity of the light exiting from such a point of the light guide surface along the surface normal. Frequently herein, the preferred direction is the vertical orientation. Without loss of generality, here, a negative angle is assigned to the side on which the light is coupled in; i.e., an angle of −90° corresponds to a direction from which incoupling takes place. Herein, the limiting angles σ, γ are definitely specified according to the optical performance desired for the respective application. In case of the particularly preferred limiting angles γ=σ=40°, the light intensity condition then only applies to angles between −40° and −80° as well as between 40° and 80°. The smaller the limiting angles σ, γ, the more light will, in the one or two preferred directions, be concentrated onto the vertical bisector. In a car, for example, where, in mode B1, the driver and the front-seat passenger look at a screen with the invented illumination apparatus at relatively well-definable viewing angles, one would rather select limiting angles σ, γ smaller than 40°. In a laptop, by contrast, due to the foldability of the screen and the universal application scenario regarding the viewing angles of different persons, it would make sense to have limiting angles around 40° or greater. The 80° limit may possibly be shifted to 70°.

In this way, if the invented illumination apparatus with added screen is installed in a car, one can achieve, e.g., a reduction of disturbing reflections on the windshield, especially during night-time drives. Furthermore, meeting the above condition results in a conspicuous efficiency of outcoupling from the light guide, and that without the use of any focusing layers such as prism films or the like.

Using the invented illuminating apparatus is particularly advantageous in connection with a screen that can be operated in at least two operating modes, viz B1 for a free viewing mode and B2 for a restricted viewing mode, comprising
  an illuminating apparatus according to the invention, and
  a transmissive image generator arranged in front of the light guide.

Further, it is of advantage for the invention if one uses an image generator composed of pixels which themselves consist of subpixels, and if each dimension of the said outcoupling elements, i.e. height, depth and width, is smaller than the minimum of width and height of the subpixels of the image generator employed, i.e. smaller than the minimum of these two quantities. Preferably, each dimension of the said outcoupling elements, i.e. height, depth and width, is even smaller by a factor of 1.3, 1.5 or 2.0 than the minimum of width and height of the subpixels of the image generator used. In this way, the image gets more homogeneous, and superimpositions of structural patterns and subpixel patterns can possibly be avoided.

Another practical embodiment of the invented screen includes another light guide (made of glass or plastic, e.g.) that is arranged (seen in the viewing direction) in front of the image generator and provided with means for light outcoupling, and into which light can be fed laterally by light sources. The outcoupling means used here are, e.g., those described above, or of a kind known in prior art, such as nanoparticles of titanium dioxide, barium sulfate etc. in suitable sizes and quantities—as described, e.g., in WO 2015/121398 A1 and WO 2017/089482 A1—, which are homogeneously distributed in the volume of the light guide. With this embodiment, any unintentional residual light in Mode B2 in angular ranges that are actually protected from being viewed can be interfered with or glared to such an extent that no contrast is visible and no image can be perceived from disallowed angles. Here again, the outcoupling elements may be fashioned in the form of cavities or on interfaces, so that, when used in a car, e.g., they make sure that information displayed can only be seen by the front-seat passenger but not by the driver, in that radiation is restricted to the respective partial space.

The light sources eligible are adapted to radiate colored or white light, and they can radiate light of a color that is not present in the image displayed by the transmissive image generator.

Alternatively it is possible for the light sources to radiate light of a color that is present in the image displayed by the transmissive image generator or is close to such a color in the color spectrum. Finally, it is feasible for the light sources to radiate light of a color approximately corresponding to a color complementary to a color present in the image displayed by the transmissive image generator.

"Colored light" is understood especially to be visible light that is not white, e.g. light of red, green, blue, turquoise, cyan, magenta or yellow color. Further, this light can optionally be radiated at various brightness levels. Moreover, it is possible for the chromatic properties, e.g. the color and/or brightness, of the light emitted by the light sources to be modulated in time. In addition, the light sources may comprise different light sources, such as, e.g., RGB LEDs in LED rows radiating light of different colors and/or different brightnesses either simultaneously or at different times, and/or staggered.

Arranged on the top side of the image generator and/or on at least one of the large surfaces of the light guide as well as on at least one of the privacy filters, if any, can be means for reflection diminishing or scattering, e.g. an antiglare and/or antireflection coating.

The invented screen can, to particular advantage, be used in a motor vehicle to optionally display image contents only to the front-seat passenger in mode B2, or simultaneously to the driver and the front-seat passenger in mode B1. The former is helpful, e.g., if the front-seat passenger is watching entertainment contents that might detract the driver's attention.

A screen according to the invention can be used to enter as well as to display sensitive data, such as PINs, e-mails, SMS text messages or passwords, at ATMs, payment terminals or mobile devices.

In all embodiments mentioned above, the said light sources may be LEDs or LED rows or laser diodes. Other versions are feasible and are within the scope of the invention.

Furthermore, the desired restricted angular ranges for restricted viewing in mode B2 may be defined and implemented separately for the horizontal and vertical directions. In the vertical direction, for example, a larger angle than in the horizontal direction, or else no restriction at all, might be useful, say, if, at an ATM, persons of differing body heights are to see an image, whereas sideways viewing is to remain greatly or completely restricted. For POS payment terminals, on the other hand, safety regulations frequently necessitate viewing restrictions in mode B2 both in horizontal and vertical directions.

On principle, the performance of this invention remains unaffected even if the parameters described above are varied within certain limits.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in more detail with reference to the accompanying drawings, which also show features essential to the invention, among others, and in which.

The drawings are not to scale and illustrate principles only.

DETAILED DESCRIPTION OF THE DRAWINGS

Figure 1:
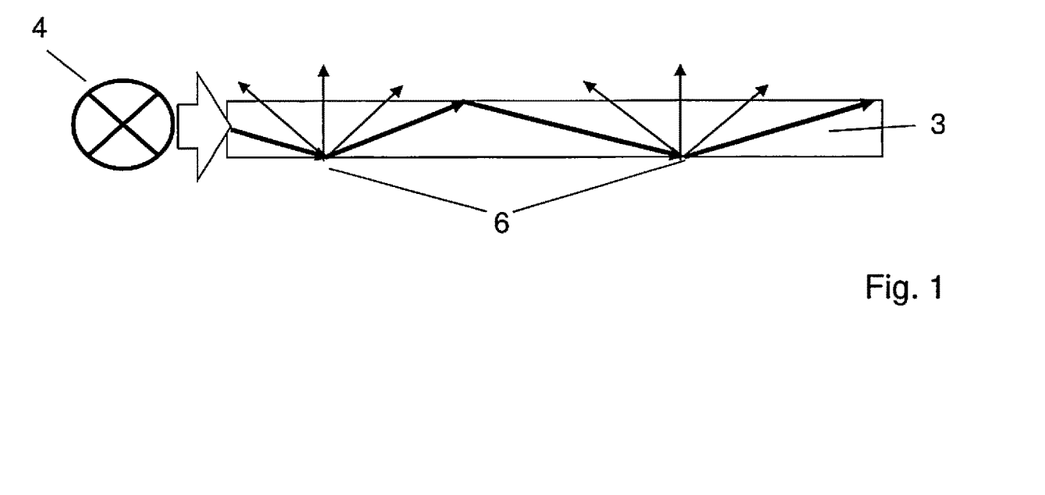
FIG. 1 is a sketch illustrating the principle of light that is laterally coupled into a light guide being outcoupled from the lower large surface of the light guide, with the outcoupling elements being provided on the said lower large surface, and with the light exiting from the upper large surface of light guide.

FIG. 1 is a sketch illustrating the principle of light that is laterally coupled into a light guide 3 by light sources 4 and outcoupled from the lower large surface of the light guide 3, with the outcoupling elements 6 being provided on the said lower large surface. The outcoupled light, however, exits from the upper large surface of the light guide 3. In the horizontal direction, the light is outcoupled from the upper large surface of the light guide 3 in a large angle here. The locations of the outcoupling elements 6 are suggested by the reference number 6, but the outcoupling elements 6 proper are not shown, because they have to be of microscopic size. Light, then, is coupled in laterally into light guide 3 by the light sources 4, e.g., by LEDs. Due to total reflection, rays of the coupled-in light (represented by bold rays) are reflected by the outer wall and thrown back into the light guide 3 until they finally (probably after repeated hits) hit an outcoupling element 6 to undergo the desired outcoupling. This outcoupling is represented by the thin rays. For better understanding, the representation in FIG. 1 is highly schematic; in reality, the light guide 3 has a vast number of ray paths.

Figure 2:
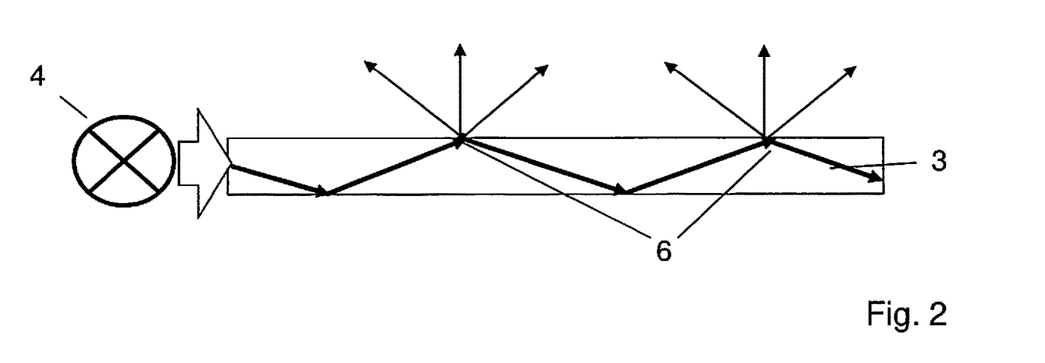
FIG. 2 is a sketch illustrating the principle of light that is laterally coupled into a light guide being outcoupled from the upper large surface of the light guide, with the outcoupling elements being provided on the said upper large surface, and with the light exiting from the upper large surface of the light guide.

FIG. 2 is a sketch illustrating the principle of light that is laterally coupled into a light guide 3 by light sources 4 and outcoupled from the upper large surface of the light guide 3, with the outcoupling elements 6 being provided on the said upper large surface. Here again, the outcoupled light exits from the upper large surface of the light guide 3. The comments on FIG. 1 apply accordingly.

What is technically different here is merely the location and possibly the configuration of the outcoupling elements 6, which now occupy the upper side of the light guide 3, thus outcoupling the light directly up without the need to once again cross the light guide 3 in order to exit from it as shown in FIG. 1

Figure 3:
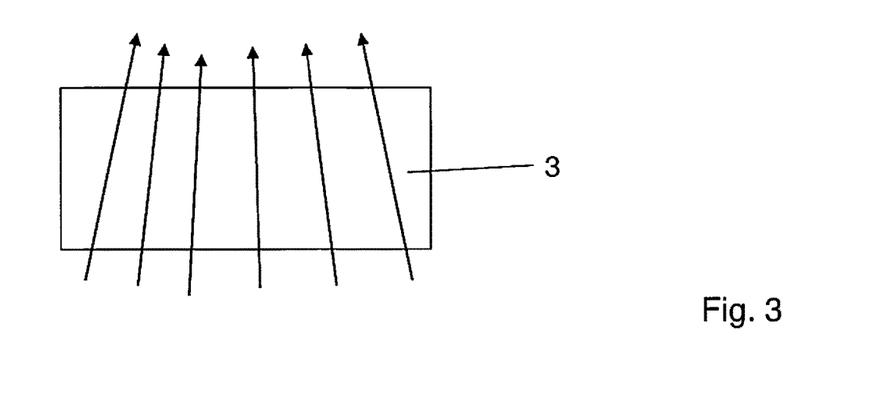
FIG. 3 is a sketch illustrating the principle of light emitted by a backlight passing a light guide.

FIG. 3 is a sketch illustrating the principle of light originating from a backlight 2 passing a light guide 3 through both of its large surfaces, i.e. across its volume. Here, the outcoupling elements 6 play a part that is essentially negligible, because the light originates from the backlight 2, i.e., the light is not coupled into the light guide 3 laterally through an edge from light sources 4, and therefore it is not, or scarcely, deflected back and forth by total reflection in the light guide 3. Accordingly, the outcoupling elements 6 are not shown in the drawing, since their effect in this constellation is negligible.

Figure 4:
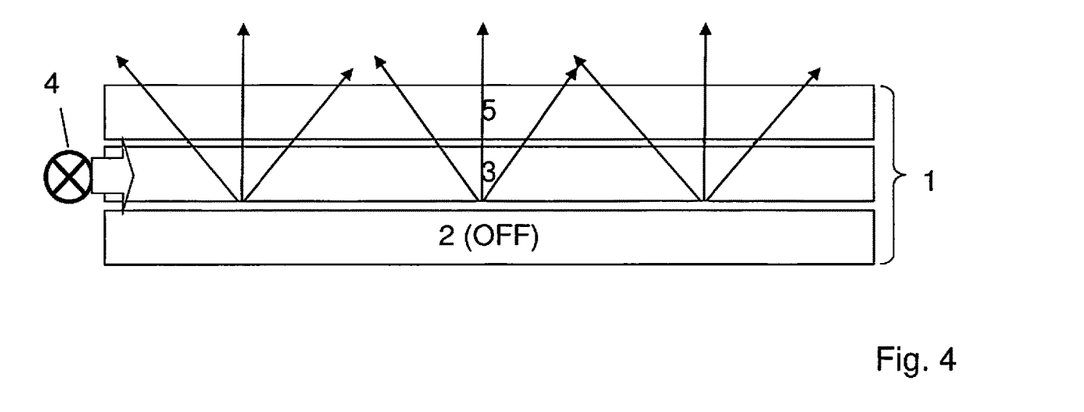
FIG. 4 is a sketch illustrating the principle of the invented illuminating apparatus in interaction with an image generator in mode B1 for a free viewing mode.

FIG. 4 is a sketch illustrating the principle of an illuminating apparatus with an image generator 5 (hereinafter jointly represented under the term of the viewed "screen 1") in B1 mode for a free viewing mode.

The said screen 1 comprises
- a backlight 2 of planar extension, radiating light into a restricted angular range, the said restricted angular range here meaning, e.g., an angular range of +/−30 degrees to the left and right of the normal to the backlight 2 surface (in defining the restricted angular range, small light quantities with maximum brightnesses of less than 3% to 5% may possibly be left out of account);
- a transmissive image generator 5 arranged in front of the backlight 2 as seen in the viewing direction;
- a plate-shaped light guide 3 arranged between the image generator 5 and the backlight 2, which is provided with outcoupling elements 6 on at least one of its large surfaces and/or within its volume, the light guide 3 being transparent to at least 70% of the light emitted by the backlight 2, light sources 4 arranged laterally on the edges of the light guide 3, preferably on one or both of the two long edges of the light guide 3, i.e., in a horizontal orientation (landscape mode), on the top and bottom edges;

wherein the number of outcoupling elements 6—not shown in the drawing—per surface area and their extension are selected such that the light guide 3, on at least 50% of its surface, has an average haze value of less than 7%, but preferably less than 2% or, with special preference, less than 1%, measured according to ASTM D1003, procedure A with a haze meter as reference, whereby the light radiated by the backlight 2, at least in B2 mode in a restricted angular range, is only negligibly, if at all, scattered at angles outside the said angular range when it passes the light guide 3;

wherein furthermore a distribution of the outcoupling elements 6 on at least one of the large surfaces and/or within the volume of the light guide 3 is specified in such a way that light irradiated by the light sources 4 into the light guide 3 and coupled out of the light guide 3 by the outcoupling elements 6 satisfies the following conditions, without the need to use additional optical layers such as diffusers, reflectors, etc.:

At least 30% of the quantity of light outcoupled at one of the large surfaces in an angular range between −50° and +50° relative to the normal to the large surface is radiated in an angular range between −20° and +20° relative to one or two specified preferred directions that are perpendicular to each other and to the surface normal, and/or at least 40% of the quantity of light outcoupled at one of the large surfaces in an angular range between −50° and +50° relative to the normal to the large surface is radiated in an angular range between −30° and +30° relative to the one or two preferred directions, and     at least 50%, preferably at least 60% or, with particular preference, at least 80% of the quantity of light coupled out of the light guide 3 is coupled out in the direction leading away from the backlight 2, wherein in mode B1 at least the light sources 4 are switched on.

The said preferred directions are mutually perpendicular and lie in a plane on the light guide 3 or on the surface of the backlight 2. In operation, e.g. at a payment terminal or in a motor vehicle, the screen is fixed relative to its outer environment, so that the preferred directions, irrespective of a portrait or landscape orientation of the screen, can be assigned, e.g., the terms "vertical" and "horizontal", which actually relate to the outer coordinate system of the environment. "Vertical" corresponds to the top-to-bottom, and "horizontal" to the left-to-right direction on the screen.

It is possible here that in the B1 mode the backlight 2 is switched on or off. In FIG. 4, for example, the backlight 2 is off. If a particularly bright mode is desired for the front view in the B1 mode, the backlight 2 may as well be on, which is not shown in the drawing.

FIG. 5 illustrates the principle of the invented screen 1 in the B2 mode for a restricted viewing mode; here, the backlight 2 is on, whereas the light sources 4 are off.

The light radiated by the backlight 2 in a restricted angular range only, represented by the bold arrows in FIG. 5, will then penetrate the light guide 3 essentially without being scattered or deflected, as described also in connection with FIG. 3, and subsequently illuminate the image generator 5 in such a way that, due to its angular restriction, the image generator 5 can only be seen from a restricted angular range. The restriction of the angular range may apply to the horizontal and/or the vertical direction.

Regarding the characteristic that the distribution of the outcoupling elements 6 on at least one of the large surfaces and/or within the volume of the light guide 3 is given in such a way that 50% or more of the light quantity outcoupled from the light guide 3 is outcoupled in the direction pointed away from the backlight 2, the following should be noted: In prior art, say, in utilizing nanoparticles such as, e.g., titanium dioxide or polymerizate in the light guide volume, about half of the light each is outcoupled from either of the large surfaces. This—and that is the point here—is not intended to be implemented by the present invention, because the light that is radiated at the backlight 2 in prior art, can hardly be sent back to the image generator 5 and will, for the biggest part, get lost in the balance of utilization.

Compared to prior art, an enormous increase in efficiency with regard to light gain is achieved by the fact that the distribution of the outcoupling elements 6 on at least one of the large surfaces and/or within the volume of the light guide 3 is preset in such a way that light radiated by the light sources 4 into the light guide and outcoupled from the light guide 3 by the outcoupling elements 6—without additional optical layers such as diffusers, reflectors or brightness enhancement films, which enhance the outcoupled light quantity only in a non-directional manner—satisfies the conditions that at least 30% of the light quantity outcoupled at one of the large surfaces in an angular range between −50° and +50° relative to the normal to the large surface is radiated in an angular range between −20° and +20° related to one or two specified preferred directions that are perpendicular both mutually and relative to the surface normal, e.g., in the vertical and/or the horizontal direction described above, and/or at least 40% of the light quantity outcoupled at one of the large surfaces in an angular range between −50° and +50° relative to the normal to the large surface is radiated in an angular range between −30° and +30° related to the one or two preferred directions. This efficiency increase is due to the fact that the additional optical layers mentioned above cannot be used, as a rule, since otherwise the B2 mode would be disabled due to scattering, refraction and possibly other optical effects.

The outcoupling elements 6 have maximum dimensions of 100 μm, preferably between 1 μm and 30 μm. Typically, the number of outcoupling elements 6 per unit area varies across the surface of the light guide 3 in order to achieve the desired outcoupling properties such as, e.g., homogeneity.

The outcoupling elements 6 for light outcoupling from at least one of the large surfaces of the light guide 3 preferably consist of microlenses and/or microprisms and/or diffractive structures and/or three-dimensional structural elements, their largest dimension having a maximum extension smaller than 35 μm, preferably smaller than 15 μm.

Thus, if the outcoupling elements 6 are provided on at least one of the large surfaces of the light guide 3, the said outcoupling elements are advantageously formed from some plastic structured by means of a tool. This is possible in mass production, e.g., by applying a UV-curing material (e.g., a lacquer or varnish, a monomer, etc.) onto a light guide substrate, structuring the said material by means of a tool and curing it by UV radiation, e.g., polymerization. Other eligible manufacturing processes are, e.g., injection molding, hot embossing and lithography.

Finally, the light guide 3 or its substrate may contain at least 40 wt.-%, preferably at least 60 wt.-% polymethylmethacrylate, referred to its weight. Alternatively, the material contained can be polycarbonate (PC), e.g.

In another favorable embodiment of the invention, in mode B1, as a function of specified limiting angles σ, γ, the outcoupled light exiting from the light guide 3 at an angle β will, at every point of the light guide surface in angular ranges satisfying the conditions of $80°>\beta>\gamma$ and/or $-80°<\beta<-\sigma$, with $10°<\gamma<80°$ and $10°<\sigma<80°$ and preferably with $\gamma=\sigma=40°$, measured normal to the light guide 3 surface and in at least one of the two preferred directions, e.g., in a vertical orientation relative to the surface of the light guide 3 (orientation here means the alignment of the light guide 3 and, thus, inherently also of the image generator 5, especially a portrait or landscape orientation), have maximally 80%, preferably maximally 60% or, with particular preference, maximally 50% of the luminous intensity of the light exiting from such a point of the surface of the light guide 3 normal to that surface, i.e. along the surface normal. Thereby, one achieves, e.g., a reduction of disturbing reflexes in the windshield, especially in night-time driving, if the invented screen is installed in a motor vehicle. The limiting angles $\sigma, \gamma$ are specified and fixed in accordance with the desired application of the illuminating apparatus, e.g. in a motor vehicle or in a laptop.

Figure 6:
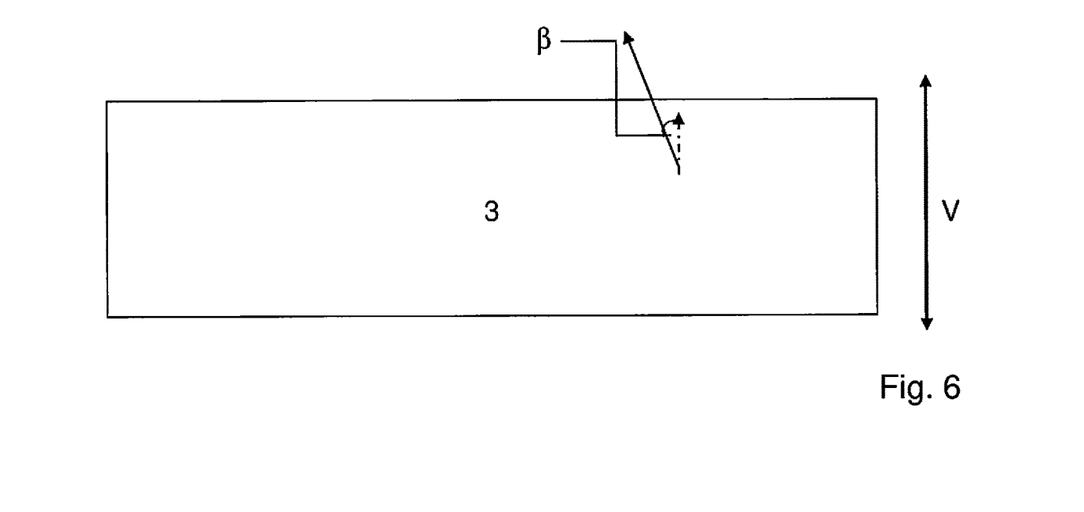
FIG. 6 is a schematic representation of the definition of the vertical direction of the angle β to be measured.

Concerning this, FIG. 6 is a schematic representation of defining the vertical direction of the angle $\beta$ to be measured, wherein the light guide 3 (as also the image generator 5 not shown) is arranged in the landscape mode, i.e., the long edges are at the top and the bottom. The dash-dot line represents a direction normal to the surface of the light guide 3, relative to which, in a vertical orientation or plane, marked here by the dual-pointed arrow lettered "V", the angle $\beta$ is measured.

FIG. 7, then, is an example of a graph of the relative brightness of the light outcoupled from the light guide 3, measured in B1 mode in vertical direction. The abscissa represents the angle $\beta$, and the ordinate represents a relative luminance measured in vertical direction at the respective angle $\beta$. It is clearly visible that, as described above for the B1 mode, the light emitted by the light sources 4 and exiting from the light guide 3 at the selected measuring point on its surface at angles $\beta>40$ degrees and/or $\beta<-40$ degrees, has maximally 50% (here, even less than about 25%) of the light intensity of the light exiting from the selected point of the surface of the light guide 3 normal to its surface.

Figure 9:
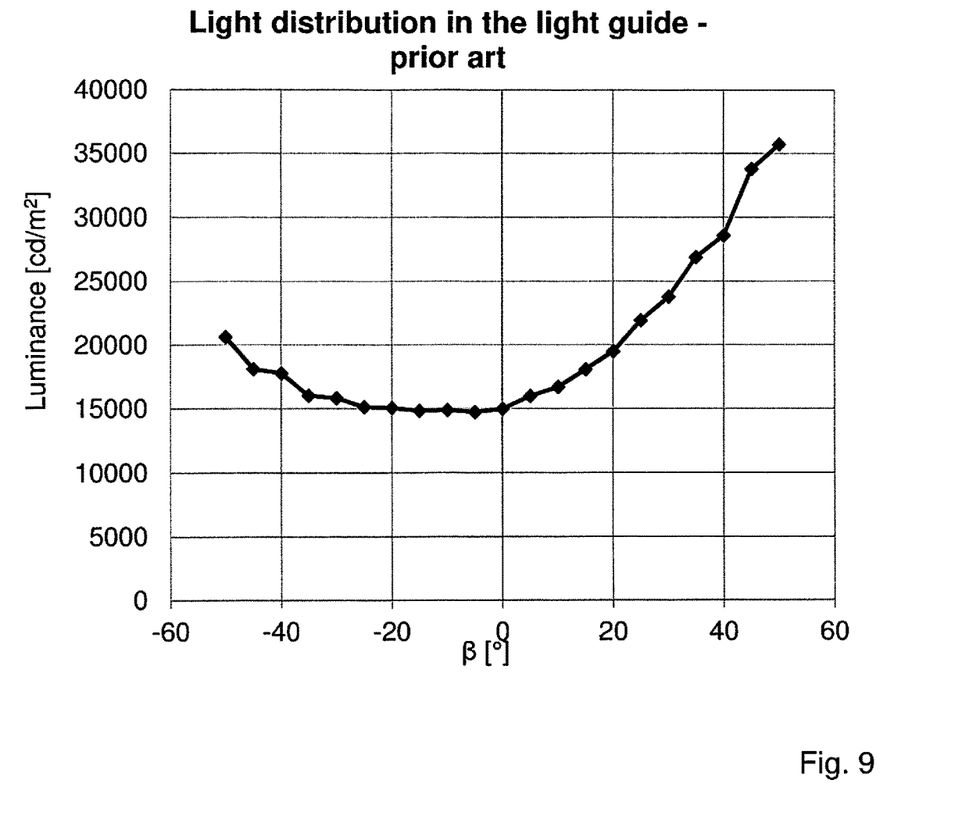
FIG. 9 shows the vertical brightness distribution across an angular range for a state-of-the-art light guide.

FIG. 9 shows the brightness distribution along a preferred direction—here, the vertical direction accordingly positioned in a higher-rank coordinate system—across an angular range of the exit angle $\beta$ for a light guide of prior art, this distribution resulting without any additional layers such as diffuser layers, brightness enhancement films or reflector layers otherwise common in a backlight. Whereas in prior art these additional layers arrange for adapting the light distribution parameters to given values, they cannot be used in the illuminating apparatuses and screens described above and below, because operation in B2 mode would not be possible then, because these layers, due to their non-directional, statistical radiation, eliminate any privacy effect.

Figure 8:
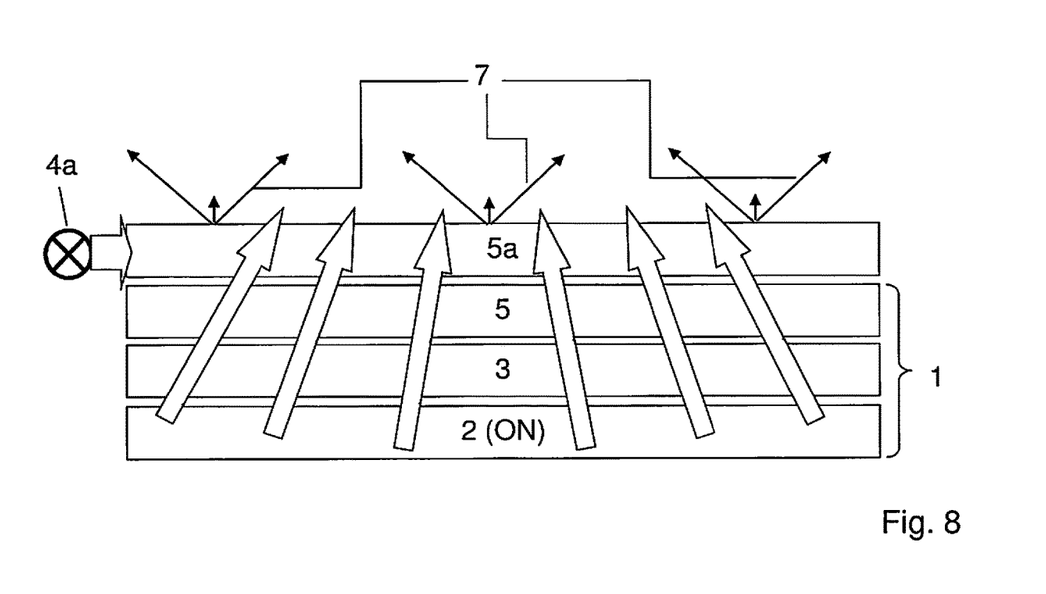
FIG. 8 shows an embodiment of the invented illuminating apparatus in interaction with an image generator, wherein, in front of the image generator as seen in the viewing direction, another light guide is arranged that is provided with means for outcoupling light and into which light can be fed laterally by light sources.

Another practical embodiment of the invented screen 1, as shown in FIG. 8, includes another light guide 5a that is arranged (seen in the viewing direction) in front of the image generator 5 and provided with means for light outcoupling, and into which light can be fed laterally by light sources 4a. The outcoupling means used here are, e.g., those described above for the light guide 3. With this embodiment, any unintentional residual light in Mode B2 in angular ranges actually protected against viewing can be interfered with or glared (see the thin, oblique arrows in FIG. 8), so that no contrast is visible and no image can be perceived from the disallowed angles.

The light sources 4a eligible are adapted to radiate colored or white light, and they can radiate light of a color that is not present in the image displayed by the transmissive image generator 5.

Further, this light can optionally be radiated at various brightness levels. Moreover, it is possible for the chromatic properties, e.g. the color and/or brightness, of the light emitted by the light sources 4a to be modulated in time. In addition, the light sources may comprise different light sources 4a, such as, e.g., RGB LEDs in LED rows radiating light of different colors and/or different brightnesses either simultaneously or at different times, and/or staggered.

The light guide 5a, especially if it uses, in a suitable way, outcoupling elements 6 similar to those described for the light guide 3, may just as well outcouple light in one selected direction only, e.g., to the left or the right, but almost not, or to a negligible extent only, normal to its surface. This has the advantage that the image contrast is, for the person directly in front of the screen in mode B2, is not, or almost not, reduced, whereas privacy protection sideways is markedly improved as described above.

Furthermore, the said restricted angular range may be configured either symmetrically or asymmetrically relative to the surface normal of the image generator 5. The latter is helpful, in particular, in motor vehicle applications, e.g., if the screen 1, constituting a so-called center information display, is arranged on the dashboard about halfway between the driver and the front-seat passenger. In this case, the restricted angular viewing range that is exclusively free for the passenger must be configured asymmetrically, i.e. directed towards the passenger.

The backlight 2 may, e.g., consist of
- a planar emitter, preferably a light guide with light sources such as LEDs arranged at its edges or on the rear surface, and
- two light collimators crossed at right angles and integrated in the planar emitter and/or arranged in front of it, such as, e.g., "Optical Lighting Film"™ made by 3M™ or prism arrays, and at least one privacy filter, also made, e.g., by 3M™, arranged in front of it.

Using a so-called directed backlight as a backlight illuminator 2 is possible as well.

It is particularly advantageous to use the invented screen 1 in a vehicle for selectively displaying image contents for the front-seat passenger only in B2 mode, or simultaneously for the driver and the front-seat passenger in B1 mode. The former applies to the case that, e.g., the front-seat passenger is watching entertainment contents that could distract the driver's attention.

In all embodiments described above, the said light sources 4 or. 4a may be LEDs or LED rows or laser diodes. Other versions are feasible as well and are within the scope of the invention.

The above-described illuminating apparatus according to the invention and the screen that can be implemented therewith solve the problem addressed and permit to be readily translated into practical solutions providing privacy-proof presentation of information by means of an optionally restricted viewing angle and, in a separate operating mode, free viewing without any restriction of the viewing angle. The invention can be put into practice by simple means and at affordable cost. In both operating modes, the native resolution of the image display device employed can be utilized. Moreover, the solution causes but little light loss.

The invention described above can be used to advantage wherever confidential data are displayed and/or entered, such as in entering PINs or passwords, data display at ATMs or payment terminals, or reading e-mails on mobile devices. As also described above, the invention can also be used in cars.

The invention claimed is:

1. An illuminating apparatus for a screen that can be used in at least two operating modes, B1 for a free viewing mode and B2 for a restricted viewing mode, comprising:
   a backlight of planar extension that radiates light in a restricted angular range;
   a plate-shaped light guide that is located in front of the backlight as seen in the viewing direction and is provided with outcoupling elements on at least one of its large surfaces and/or within its volume, wherein the light guide is transparent to at least 70% of the light emitted by the backlight;
   light sources arranged laterally at edges of the light guide;
      wherein a number of outcoupling elements per surface area and their extension are selected such that the light guide, on at least 50% of its surface, has an average haze value of less than 7%, measured according to ASTM D1003, whereby the light radiated by the backlight at least in B2 mode in the restricted angular range is only negligibly, if at all, scattered at angles outside the angular range when the light radiated by the backlight passes the light guide;
      wherein in mode B2 the backlight is switched on and the light sources are switched off, whereas in mode B1 at least the light sources are switched on;
   and a distribution of the outcoupling elements on at least one of the large surfaces and/or within the volume of the light guide is specified in such a way that light irradiated by the light sources into the light guide and coupled out of the light guide by the outcoupling elements satisfies the following conditions:
      least 30% of a quantity of light outcoupled at one of the large surfaces in an angular range between −50° and +50° relative to a normal to the large surface is radiated in an angular range between −20° and +20° with respect to a surface normal to the large surface and relative to one or two specified preferred directions that are perpendicular to each other and to the surface normal, and/or at least 40% of the quantity of light outcoupled at one of the large surfaces in an angular range between −50° and +50° relative to the normal to the large surface is radiated in an angular range between −30° and +30° relative to the one or two preferred directions, and
      at least 50% of the quantity of light coupled out of the light guide is coupled out in a direction leading away from the backlight.

2. The illuminating apparatus as claimed in claim 1, wherein the light guide comprises a transparent thermoplastic or thermoelastic material or glass.

3. The illuminating apparatus as claimed in claim 1, the distribution of the outcoupling elements on at least one of the large surfaces and/or within the volume of the light guide is specified in such a way that the light coupled out on at least 70% of the surface of the light guide attains a homogeneity of the luminance of at least 70%.

4. The illuminating apparatus as claimed in claim 1, wherein the outcoupling elements have maximum dimensions of 100 µm.

5. The illuminating apparatus as claimed in claim 1, wherein the outcoupling elements comprise one or more of microlenses, microprisms, diffractive structures, three-dimensional structural elements, and scattering elements.

6. The illuminating apparatus as claimed in claim 1 with outcoupling elements fashioned within the volume of the light guide wherein the outcoupling elements are fashioned as cavities that each have an outer shape of a microlens, microprism or diffractive structure.

7. The illuminating apparatus as claimed in claim 6, wherein the cavities are filled with some gaseous, liquid or solid material, the material having a refractive index deviating from that of the material used for the light guide, or that the cavities contain vacuums.

8. The illuminating apparatus as claimed in claim 6, wherein the cavities are filled with some gaseous, liquid or solid material, the material having a haze value deviating from that of the material used for the light guide.

9. The illuminating apparatus as claimed in claim 6, wherein the light guide is made of two similar substrate layers joined by their boundary surfaces, and that the cavities are created as material recesses in at least one of the boundary surfaces, the cavities having the outer shape of microlenses, microprisms, three-dimensional structural elements or diffractive structures.

10. The illuminating apparatus as claimed in claim 1, wherein the outcoupling elements, when provided on at least one of the large surfaces or boundary surfaces of the light guide, are made of some plastic or glass structured by means of a tool.

11. The illuminating apparatus as claimed in claim 1, wherein the backlight comprises:
   a planar emitter, including a light guide with light sources arranged laterally or on a rear surface, and
   at least one light collimator integrated in the planar emitter and/or arranged in front of the planar emitter.

12. The illuminating apparatus as claimed in claim 1, wherein in mode B1, as a function of specified limiting angles σ, γ, the outcoupled light exiting from the light guide at an angle β will, at every point of the light guide surface in angular ranges satisfying the conditions of $80°>\beta>\gamma$ and/or $-80°<\beta<-\sigma$, with $10°<\gamma<80°$ and $10°<\sigma<80°$, measured normal to the light guide surface and in at least one of the two directions, have maximally 80% or, with particular preference, maximally 50% of the light intensity of the light exiting from such a point of the light guide surface along the surface normal.

13. A screen that can be operated in at least the two operating modes, B1 for a free viewing mode and B2 for a restricted viewing mode, comprising:
   an illuminating apparatus as claimed in claim 1, and
   a transmissive image generator arranged, in the viewing direction, in front of the light guide.

14. The screen as claimed in claim 13, wherein a second light guide provided with a light outcoupling structure is arranged, in a viewing direction, in front of the image generator, and is configured to receive light laterally from light sources, wherein the second light guide is provided with outcoupling elements.

15. The screen as claimed in claim 13, wherein the image generator is provided with pixels that are assemblies of subpixels, and each dimension of the outcoupling elements in height, depth and width is smaller than a minimum of width and height of the subpixels of the image generator.

16. The use of an illuminating apparatus as claimed in claim 1 in a vehicle for selectively displaying image contents either for a front-seat passenger only in operating mode B2 or simultaneously for a driver and the front-seat passenger in operating mode B1.

17. The illuminating apparatus of claim 4, wherein the outcoupling elements have maximum densities between 1 µm and 30 µm.

18. The illuminating apparatus of claim 7, wherein the material has a refractive index lower than that of the material used in the light guide.

19. The illuminating apparatus of claim 8, wherein the material has a haze value higher than that of the material used for the light guide.

20. A screen as claimed in claim 13 in a vehicle for selectively displaying image content, either for a front-seat passenger only in operating mode B2 or simultaneously for a driver and the front-seat passenger in operating mode B1.

* * * * *

UNITED STATES PATENT AND TRADEMARK OFFICE
CERTIFICATE OF CORRECTION

PATENT NO. : 10,712,488 B2
APPLICATION NO. : 16/476846
DATED : July 14, 2020
INVENTOR(S) : André Heber et al.

It is certified that error appears in the above-identified patent and that said Letters Patent is hereby corrected as shown below:

In the Specification

In Column 1, Line 44, delete "films" and insert -- films. --, therefor.

In Column 2, Line 6, delete "i.e." and insert -- i.e., --, therefor.

In Column 2, Line 8, delete "i.e." and insert -- i.e., --, therefor.

In Column 3, Line 11, delete "i.e." and insert -- i.e., --, therefor.

In Column 4, Line 27, delete "that" and insert -- than --, therefor.

In Column 5, Line 57, delete "i.e." and insert -- i.e., --, therefor.

In Column 6, Line 6, delete "i.e." and insert -- i.e., --, therefor.

In Column 6, Line 37, delete "e.g." and insert -- e.g., --, therefor.

In Column 6, Line 45, delete "etc.-onto" and insert -- etc.,-onto --, therefor.

In Column 7, Lines 53-54, delete "comprising" and insert -- comprising: --, therefor.

In Column 7, Line 61, delete "i.e." and insert -- i.e., --, therefor.

In Column 7, Line 63, delete "i.e." and insert -- i.e., --, therefor.

In Column 7, Line 65, delete "i.e." and insert -- i.e., --, therefor.

In Column 8, Line 11, delete "etc." and insert -- etc., --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,712,488 B2

In Column 8, Line 38, delete "e.g." and insert -- e.g., --, therefor.

In Column 8, Line 41, delete "e.g." and insert -- e.g., --, therefor.

In Column 8, Line 51, delete "e.g." and insert -- e.g., --, therefor.

In Column 9, Line 26, delete "which" and insert -- which: --, therefor.

In Column 10, Line 31, delete "FIG. 1" and insert -- FIG. 1. --, therefor.

In Column 10, Line 34, delete "i.e." and insert -- i.e., --, therefor.

In Column 10, Line 47, delete "comprises" and insert -- comprises: --, therefor.

In Column 11, Line 5, delete "that" and insert -- than --, therefor.

In Column 11, Line 40, delete "e.g." and insert -- e.g., --, therefor.

In Column 13, Line 11, delete "i.e." and insert -- i.e., --, therefor.

In Column 13, Line 17, delete "e.g." and insert -- e.g., --, therefor.

In Column 13, Line 30, delete "(3," and insert -- β, --, therefor.

In Column 13, Line 32, delete "(3." and insert -- β. --, therefor.

In Column 14, Line 3, delete "e.g." and insert -- e.g., --, therefor.

In Column 14, Line 27, delete "i.e." and insert -- i.e., --, therefor.

In Column 14, Line 29, delete "of" and insert -- of: --, therefor.

In Column 14, Line 48, delete "or." and insert -- or --, therefor.

In the Claims

In Column 15, Claim 1, Line 8, change "the viewing direction" to "a viewing direction", therefor.

In Column 15, Claim 1, Line 20, change "the angular range" to "the restricted angular range", therefor.

In Column 17, Claim 20, Line 7, delete "A screen" and insert -- The screen --, therefor.